United States Patent
Sameer

(10) Patent No.: US 12,299,973 B2
(45) Date of Patent: May 13, 2025

(54) METHOD, APPARATUS, AND SYSTEM FOR DETERMINING A CONFIDENCE LEVEL FOR MAP FEATURE IDENTIFICATION IN A MAP APPLICATION

(71) Applicant: HERE Global B.V., Eindhoven (NL)

(72) Inventor: Priyank Sameer, Mumbai (IN)

(73) Assignee: HERE GLOBAL B.V., Eindhoven (NL)

( * ) Notice: Subject to any disclaimer, the term of this patent is extended or adjusted under 35 U.S.C. 154(b) by 666 days.

(21) Appl. No.: 17/553,129

(22) Filed: Dec. 16, 2021

(65) Prior Publication Data

US 2023/0196758 A1    Jun. 22, 2023

(51) Int. Cl.
| | |
|---|---|
| *G06T 11/60* | (2006.01) |
| *G01C 21/36* | (2006.01) |
| *G06T 3/4038* | (2024.01) |
| *G06V 10/70* | (2022.01) |
| *G06V 20/10* | (2022.01) |

(52) U.S. Cl.
CPC ........... *G06V 20/176* (2022.01); *G01C 21/36* (2013.01); *G06T 3/4038* (2013.01); *G06T 11/60* (2013.01); *G06V 10/70* (2022.01)

(58) Field of Classification Search
CPC ...... G06V 20/176; G06V 10/70; G06V 20/54; G06V 20/56; G01C 21/36; G01C 11/04; G06T 3/4038; G06T 11/60; G06N 20/00
See application file for complete search history.

(56) References Cited

U.S. PATENT DOCUMENTS

| | | | |
|---|---|---|---|
| 7,054,745 B1 | 5/2006 | Couckuyt et al. | |
| 9,909,878 B2 | 3/2018 | Beaurepaire | |
| 2015/0032424 A1 | 1/2015 | Gupta et al. | |
| 2016/0076903 A1* | 3/2016 | Diaz | G01C 21/3484 |
| | | | 701/400 |

(Continued)

FOREIGN PATENT DOCUMENTS

| | | |
|---|---|---|
| CN | 112967365 A | 6/2021 |
| WO | 2020253965 A1 | 12/2020 |

OTHER PUBLICATIONS

Korpi, Jari Arvi, Mohammad Haybatollahi, and Paula Ahonen-Rainio. "Identification of partially occluded map symbols." Cartographic Perspectives 76 (2013): 19-32. (Year: 2013).*

(Continued)

*Primary Examiner* — Amandeep Saini
*Assistant Examiner* — Denise G Alfonso

(57) ABSTRACT

An approach is provided for determining a confidence level for map feature identification in a map application. The approach involves, for instance, presenting an image of a map feature in a user interface of a device. The image is initially presented with a content of the image obscured from view. The approach also involves progressively un-obscuring the image in the user interface until an input identifying the map feature is received from a user via the user interface. The approach further involves determining a percentage of the image that is visible at a time the input is received from the user. The approach further involves personalizing an application to the user based on the feature identification confidence level.

20 Claims, 12 Drawing Sheets

(56) References Cited

U.S. PATENT DOCUMENTS

2021/0247201 A1  8/2021  Hori et al.

OTHER PUBLICATIONS

Biederman, Irving. "Recognition-by-components: a theory of human image understanding." Psychological review 94.2 (1987): 115. (Year: 1987).*

Liao, Lin, et al. "Building personal maps from GPS data." Annals of the New York Academy of Sciences 1093.1 (2006): 249-265. (Year: 2006).*

Andrews, Kevin, et al. "A smart mobile assessment tool for collecting data in large-scale educational studies." Procedia computer science 134 (2018): 67-74. (Year: 2018).*

Office Action for related European Patent Application No. 22212597.3-1009, dated May 17, 2023, 10 pages.

"Freizeitclub Berlin: Online: das Dalli-Klick-Spiel quer durch Deutschland", Feb. 3, 2021, retrieved from https://meinfreizeitclub.de/post.php?ID=493, 14 pages.

\* cited by examiner

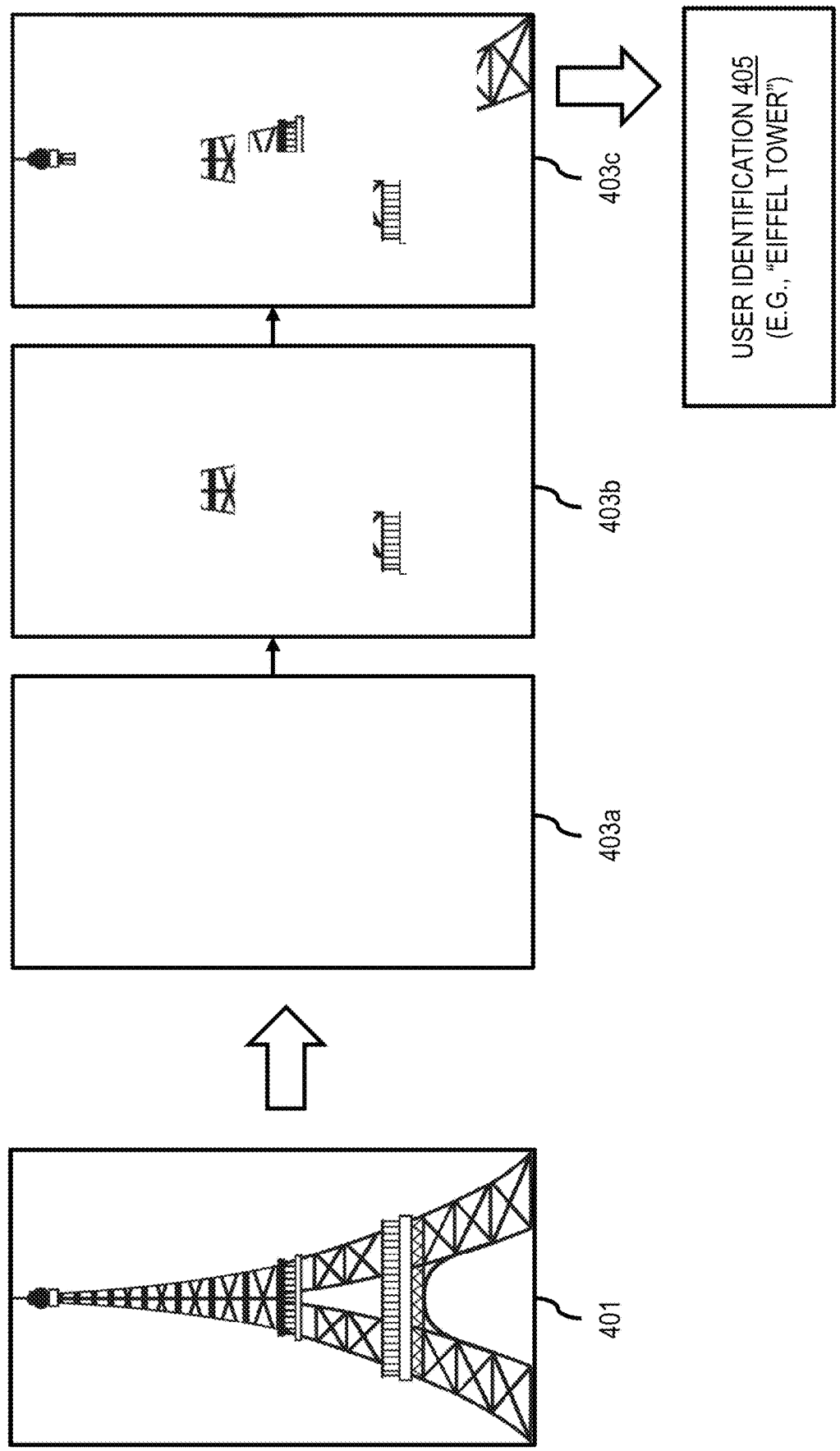

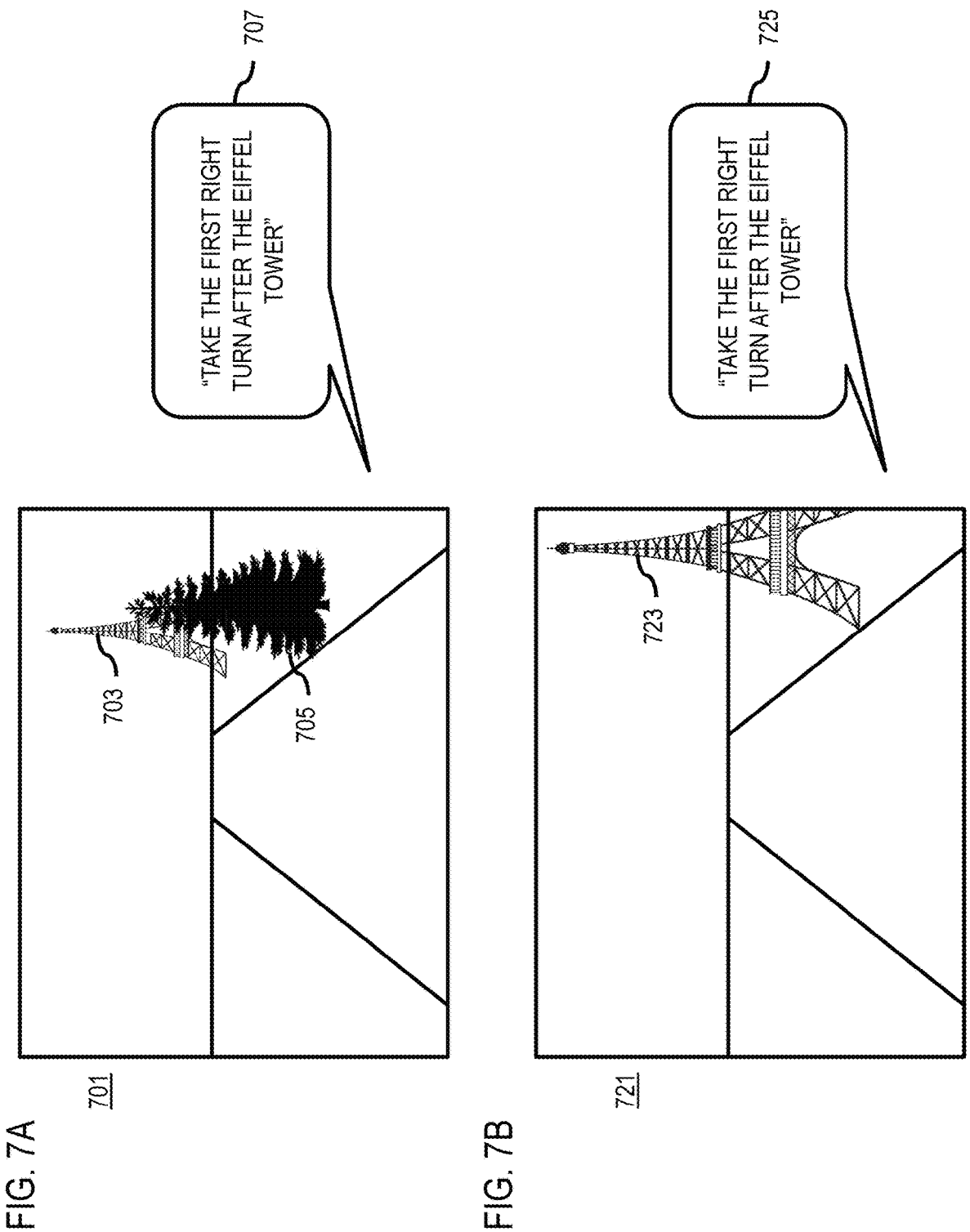

METHOD, APPARATUS, AND SYSTEM FOR DETERMINING A CONFIDENCE LEVEL FOR MAP FEATURE IDENTIFICATION IN A MAP APPLICATION

BACKGROUND

Location-based applications, particularly mapping and navigation applications, can be information dense and require users to quickly perceive and act on map data. However, the ability of users to perceive this information can vary widely between users. As a result, mapping and navigation service providers face significant technical challenges with respect assessing these differences between users.

SOME EXAMPLE EMBODIMENTS

Therefore, there is a need for determining a user's confidence level for map feature identification (e.g., as a proxy for a user's perceptive ability with respect to map data) to personalize applications and improve user experience with those application.

According to one embodiment, a method comprises presenting an image of a map feature in a user interface of a device. The image is initially presented with a content of the image obscured from view. The method also comprises progressively un-obscuring the image in the user interface until an input identifying the map feature is received from a user via the user interface. The method further comprises determining a percentage of the image that is visible at a time the input is received from the user and calculating a feature identification confidence level for the user based on the determined percentage. The method further comprises personalizing an application to the user based on the feature identification confidence level.

According to another embodiment, an apparatus comprises at least one processor, and at least one memory including computer program code for one or more computer programs, the at least one memory and the computer program code configured to, with the at least one processor, cause, at least in part, the apparatus to present an image of a map feature in a user interface of a device. The image is initially presented with a content of the image obscured from view. The apparatus is also caused to progressively un-obscure the image in the user interface until an input identifying the map feature is received from a user via the user interface. The apparatus is further caused to determine a percentage of the image that is visible at a time the input is received from the user and to calculate a feature identification confidence level for the user based on the determined percentage. The apparatus is further caused to personalize an application to the user based on the feature identification confidence level.

According to another embodiment, a non-transitory computer-readable storage medium carries one or more sequences of one or more instructions which, when executed by one or more processors, cause, at least in part, an apparatus to present an image of a map feature in a user interface of a device. The image is initially presented with a content of the image obscured from view. The apparatus is also caused to progressively un-obscure the image in the user interface until an input identifying the map feature is received from a user via the user interface. The apparatus is further caused to determine a percentage of the image that is visible at a time the input is received from the user and to calculate a feature identification confidence level for the user based on the determined percentage. The apparatus is further caused to personalize an application to the user based on the feature identification confidence level.

In addition, for various example embodiments described herein, the following is applicable: a computer program product may be provided. For example, a computer program product comprising instructions which, when the program is executed by a computer, cause the computer to perform any one or any combination of methods (or processes) disclosed.

According to another embodiment, an apparatus comprises means for presenting an image of a map feature in a user interface of a device. The image is initially presented with a content of the image obscured from view. The apparatus also comprises means for progressively un-obscuring the image in the user interface until an input identifying the map feature is received from a user via the user interface. The apparatus further comprises means for determining a percentage of the image that is visible at a time the input is received from the user and calculating a feature identification confidence level for the user based on the determined percentage. The apparatus further comprises means for personalizing an application to the user based on the feature identification confidence level.

In addition, for various example embodiments described herein, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application.

For various example embodiments described herein, the following is also applicable: a method comprising facilitating access to at least one interface configured to allow access to at least one service, the at least one service configured to perform any one method/process or any combination of network or service provider methods (or processes) disclosed in this application.

For various example embodiments described herein, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application.

For various example embodiments described herein, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4 is a diagram of example of obscuring images for determining a confidence level for map feature identification, according to one embodiment;

FIGS. 7A and 7B are diagrams illustrating examples of personalizing navigation instructions based on a map feature identification confidence level, according to one embodiment;

DESCRIPTION OF SOME EMBODIMENTS

Examples of a method, apparatus, and computer program for determine a confidence level for map feature identification are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
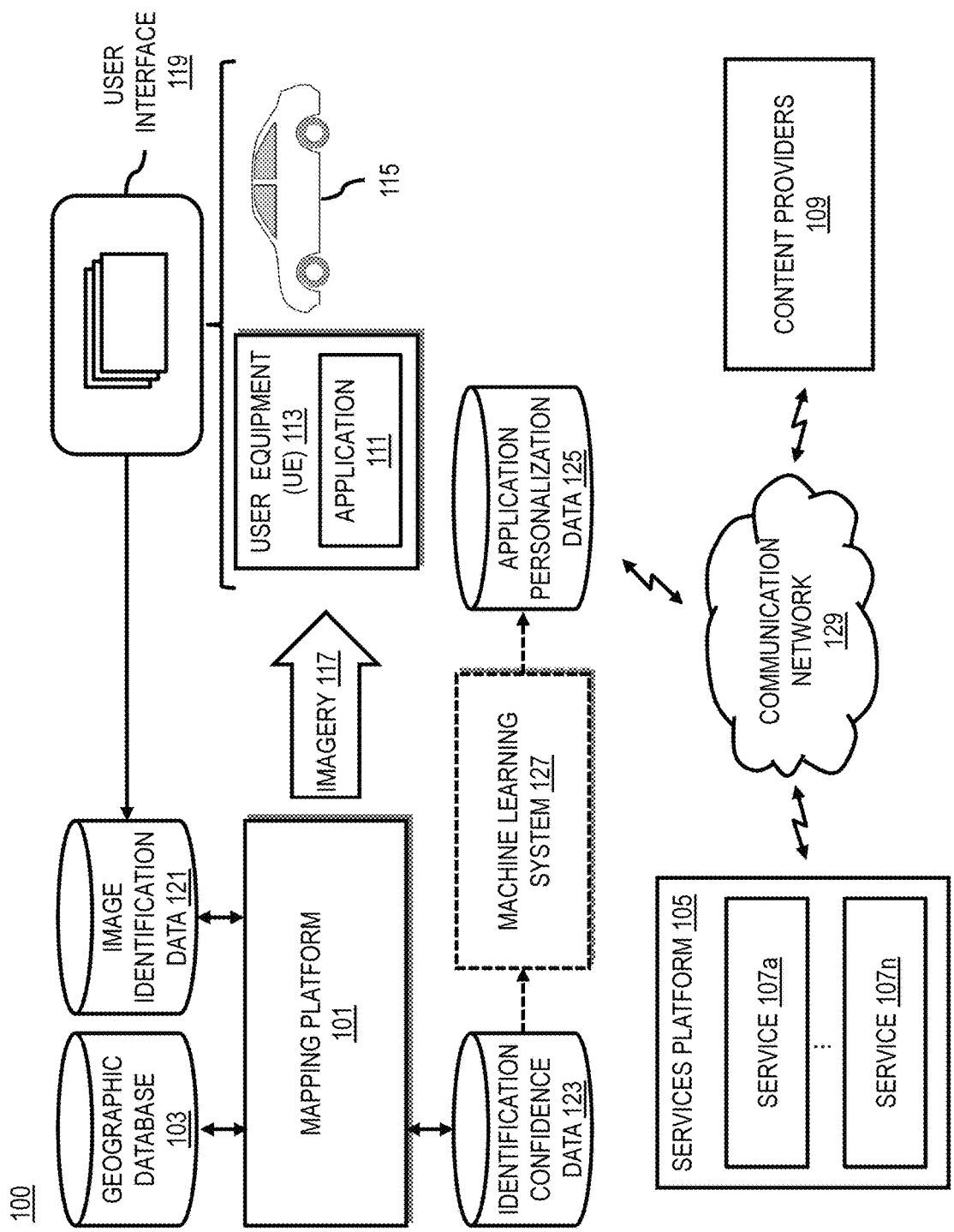
FIG. 1 is a diagram of a system capable determining a confidence level for map feature identification, according to one embodiment.

FIG. 1 is a diagram of a system capable determining a confidence level for map feature identification, according to one embodiment. Mapping and navigation applications (e.g., provided by a mapping platform 101) generally provide a significant amount of information (e.g., map data, navigation guidance instructions, etc.) for a user to perceive and comprehend. For example, navigation applications can provide voice and non-voice (e.g., visual cues, map displays, direction arrows, etc.) to a user who may already be engaged in a cognitively demanding task such as driving a vehicle. This can further affect the user's ability to perceive information from the navigation application and then correlate the information to features in the real world (e.g., looking for landmarks, points of interest (POIs), etc. specified by an application). The ability of a user or individual to perceive map features specified by a mapping application, navigation application, and/or any other location-based application is referred to herein as an "individual's observation/perception capability." In addition, as used herein "map feature" refers to any feature that is mapped or otherwise represented in digital map data (e.g., as stored in a geographic database 103).

Traditional mapping and navigation technology generally applies a universal or default value that is common to all users when considering the observation/perception capabilities (e.g., ability to identify a location, building, POI, etc. on maps). In other words, traditional mapping and navigation applications provide for no differentiation in their operation based on individual observation/perception capabilities of end users. This, in turn, can create a poor end user experience in which too little or too much information is presented at the wrong time when using mapping and/or navigation functions.

To address the technical challenges associated with issues described above, a system 100 introduces a capability to collect or otherwise determine an individual's confidence level with respect to the individual's capability to identify location, buildings, and/or any other map feature in maps and/or the real world. In other words, the system 100 provides a technical capability to assess and quantify and individual user's map feature observation/perception capability in a metric referred to herein as a map feature identification confidence level. In one embodiment, a higher confidence level indicates a greater capability to identify or perceive map feature (e.g., a location, building, POI, etc.) and conversely, a lower confidence level indicates a lesser capability.

For example, to identify a restaurant POI, for some people they need to see only the logo associated with the restaurant. Whereas for other people they need to see both the restaurant name with the logo. Then, there are yet other people that can identify the restaurant just based on building color and design. Although the above example is described with respect to a map feature that is POI (e.g., restaurant), it is noted the difference is perception applies to any type of map feature. In other words, every user has a different observation/perception capability for identifying a map feature (a location, building, POI, etc.). Accordingly, in one embodiment, the system 100 provides a capability to personalize or customize a map, mapping application, navigation application, and/or any other location-based application (e.g., provided by the mapping platform 101, a services platform 105, one or more services 107a-107n—also collectively referred to as services 107, and/or one or more content providers 109). By way of example, these applications can include an application 111 executing on client devices such as but not limited to a user equipment (UE) device 113 or a vehicle 115.

In one embodiment, the system 100 is created to perform at least one or more of the following:

Collect or otherwise determine an individual's (e.g., a user's) observation/perception capability to identify map features (e.g., a location, building, POI, etc.);

Synchronize the collected or determined user's observation/perception capability with maps or other location-based applications for personalization of one or more functions, services, features, outputs, etc.; and Provide application personalized functions, features, etc. (e.g., voice and non-voice navigation functions or guidance) based on the determined user's observation/perception capability.

More specifically, the mapping platform 101 receives imagery 117 (e.g., imagery of one or more map features of interest under one or more contexts) as inputs into the process. The mapping platform 101 can match the map features depicted in the imagery 117 against the map data of the geographic database 103 (e.g., data indicating known map features) to determine ground truth identifications of the map features. The mapping platform 101 provides the imagery 117 to the application 111 of the client devices (e.g., UEs 113, vehicles 115, and/or the like) to generate a user interface (UI) 119 for presenting the imagery 117. The UI 119 presents obscures and then progressively reveals the map feature depicted in each image of the imagery 117 and asks a user to identify the map feature. When the user is successfully able to identify the map feature in the image (e.g., by matching user input against the ground truth identification determined for each image), the percentage of the image that was visible at that the identification is made is stored as image identification data 121 for further processing by the mapping platform 101.

The mapping platform 101, for instance, processes the image identification data 121 to calculate or otherwise determine a map feature identification confidence level for a user associated with the image identification data 121. The map feature identification confidence level can be stored as identification confidence data 123 and is a metric indicating a user's feature identification capability based on what percentage of images in the imagery 117 the user must view before the user can correctly identify the depicted map feature. For example, in one embodiment, the map feature identification confidence level has an inverse relationship to the visible percentage of the image needed to identification of the corresponding map feature. In other words, a person with a high map feature identification confidence level will need smaller percentage of the image exposed to identify a map feature than a person with a low map feature identification confidence level.

In one embodiment, the mapping platform 101 can use the identification confidence data 123 of a user to determine application personalization data 125. The application personalization data 125 comprises parameters for configuring an application to be customized for the determined observation/perception capability of the user. For example, for a navigation application, the parameters can include but is not limited to: (1) types of map features (e.g., locations, landmarks, POIs, etc.) to select to reference in navigation guidance; (2) distance to the selected map feature to trigger navigation guidance instructions; (3) level of acceptable obscurity of the selected map features; and/or the like. It is contemplated that the mapping platform 101 can use any process to translate the identification confidence data 123 to application personalization data 125. In one embodiment, the processed can include but is not limited to a machine learning-based process in which a machine learning system 127 (e.g., a deep learning neural network or equivalent) uses the identification confidence data 123 as an input feature (among other possible input features) to predict the application personalization data 125.

In cases in which the application to be personalized is provided components external to the mapping platform 101 (e.g., services platform 105, services 107, and/or content providers 109), the application personalization data 125 and/or the identification confidence data 123 (e.g., individual map feature identification confidence levels or scores) can be transmitted over a communication network 129 to those components. In embodiments where the application personalization data 125 is directly transmitted, the receiving components can configure their respective application to operate using the application personalization data 125 directly. In embodiments where the identification confidence data 123 is transmitted, the receiving component can determine their respective personalization parameters for the identification confidence data 123.

In one embodiment, the various embodiments described herein are applicable any variety of use case including the use causes previously describe as well as those listed below:

The system 100 can provide voice and non-voice navigation based on an individual's observation/perception capability (e.g., as represented by the map feature identification confidence level determined according to the embodiments described herein);

This system 100 can provide a personalization service for application based on the various embodiments described herein as an optional service (e.g., as a paid or premium service, or for users who consent to the map feature identification evaluation process to assess their individual observation/perception capability);

The determination of the identification confidence data 115 can help the system 100 or associated service provider to understand more from the map users' or vehicle drivers' point of view;

Maps can be loaded as per the determine map feature identification confidence level of each user; and The users can also try to improve their map feature identification confidence level by seeing the trends of locations through the evaluation process (e.g., by viewing and identifying additional examples of different types of imagery 117).

Figure 2:
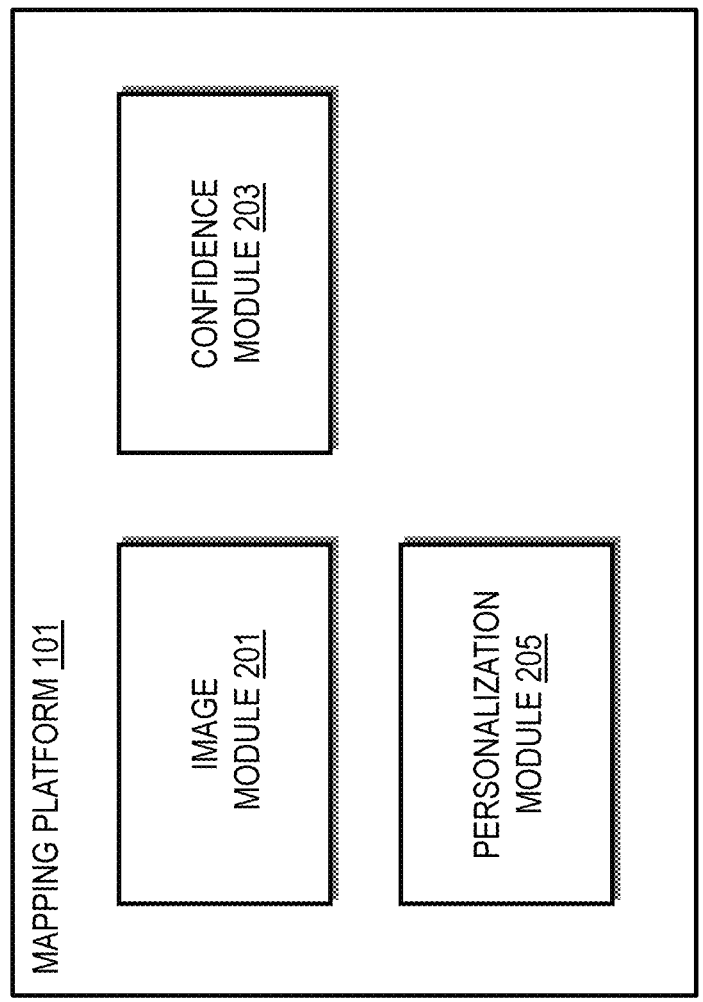
FIG. 2 is a diagram of components of a mapping platform capable of determining a confidence level for map feature identification, according to one embodiment.

FIG. 2 is a diagram of components of a mapping platform 101 capable of determining a confidence level for map feature identification, according to one embodiment. In one embodiment, as shown in FIG. 2, the mapping platform 101 of the system 100 includes one or more components for determining map feature identification confidence levels for applications according to the various embodiments described herein. It is contemplated that the functions of the components of the mapping platform 101 may be combined or performed by other components of equivalent functionality. As shown, in one embodiment, the mapping platform 101 includes an image module 201, a confidence module 203, and a personalization module 205. The above presented modules and components of the mapping platform 101 can be implemented in hardware, firmware, software, or a combination thereof. Though depicted as a separate entity in FIG. 1, it is contemplated that the mapping platform 101 may be implemented as a module of any of the components of the system 100 (e.g., a component of the services platform 105, services 107, content providers 109, vehicles 115, UEs 113, applications 111, and/or the like). In another embodiment, one or more of the modules 201-205 may be implemented as a cloud-based service, local service, native application, or combination thereof. The functions of the mapping platform 101 and modules 201-205 are discussed with respect to figures below.

Figure 3:
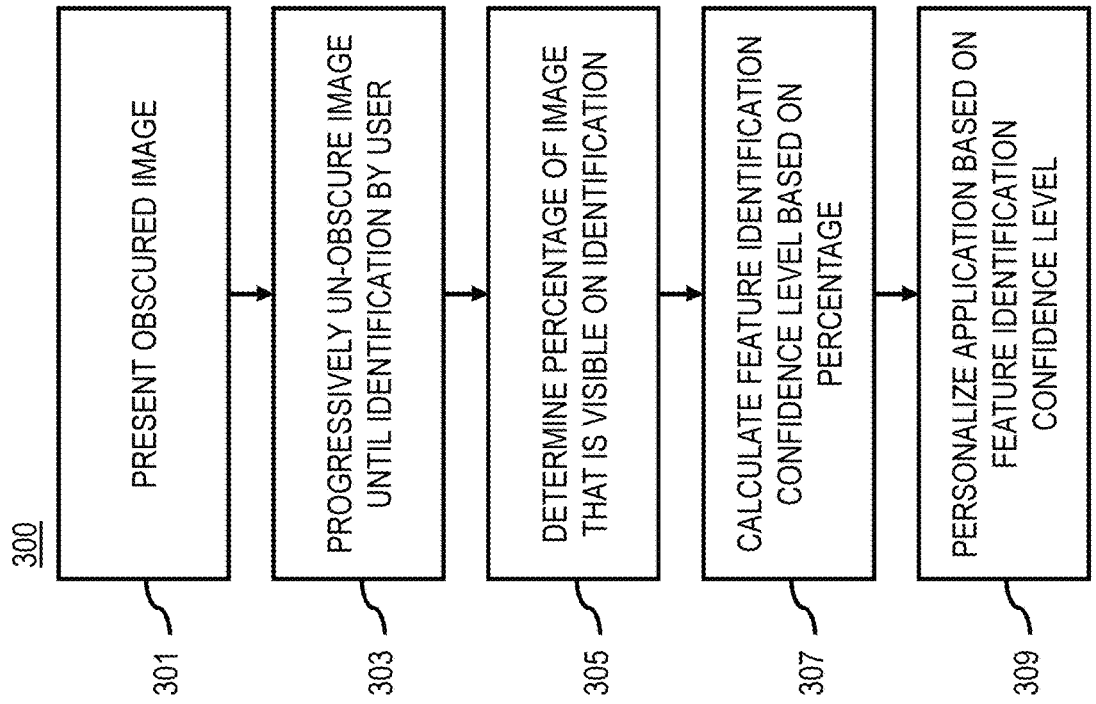
FIG. 3 is a flowchart of a process for determining a confidence level for map feature identification, according to one embodiment.
Figure 10:
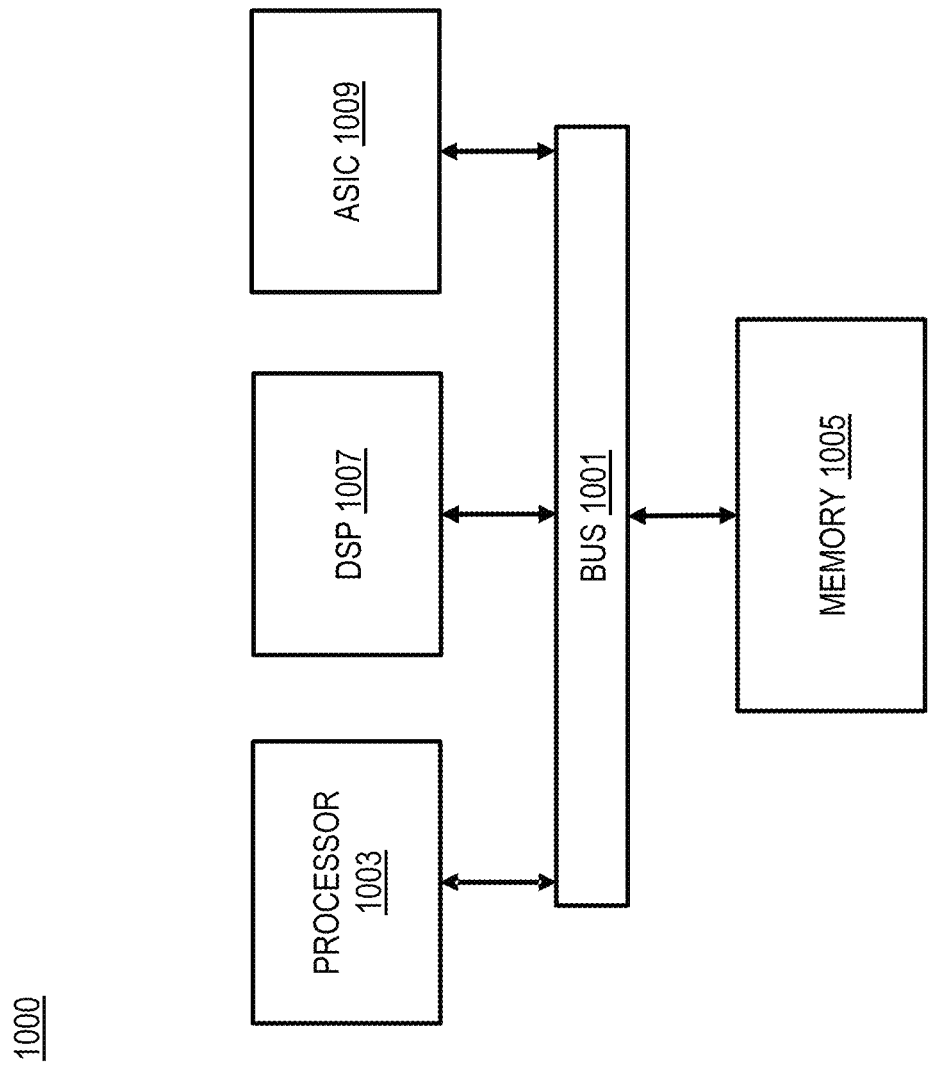
FIG. 10 is a diagram of a chip set that can be used to implement an embodiment of the processes described herein.

FIG. 3 is a flowchart of a process for determining a confidence level for map feature identification, according to one embodiment. In various embodiments, the mapping platform 101 and/or any of the modules 201-205 may perform one or more portions of the process 300 and may be implemented in, for instance, a chip set including a processor and a memory as shown in FIG. 10. As such, the mapping platform 101 and/or any of the modules 201-205 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

In step 301, the image module 201 presents an image (e.g., from imagery 117) of a map feature (e.g., location, building, POI, etc.) in a user interface (e.g., UI 119) of a device (e.g., a client device such as the UE 113, vehicle 115, or component thereof). In one embodiment, the UI 119 can be generated by the application 111 or any other application or component of the device. The image can depict any map feature of interest that can be identified or otherwise correlated to known map features stored in the geographic database 103. This known correlation or identification, for instance, enables the image module 201 to verify or check whether a user identification of the map feature is correct.

In one embodiment, the image is initially presented with a content of the image obscured from view. As used herein, obscured refers to making the image content impossible or more difficult to perceive than an unobscured image. For example, obscuring can partially or completely hide the content from view (e.g., by using a completely or partially opaque layer of a designated transparency level to cover the all or part of the image content). In another example, the content can be obscured by tiling or otherwise subdividing the image into smaller pieces, portions, segments, and/or the like. The pieces can then be scrambled or individually hidden to obscure the image content. It is noted that the above presented examples of obscuring an image are provided by way of illustration and not as limitations. It is contemplated that any method of obscuring the image can be used in the embodiment described herein.

In addition, the term "initially" refers to a first presentation of the image in the user interface 119 to a user. In this way, the user can only view the obscured image first.

In step 303, the image module 201 progressively un-obscures the image in the user interface until an input identifying the map feature is received from a user via the user interface. For example, the progressive un-obscuring process can include starting from a completely obscured image, and then making a designated percentage or portion of the image content visible. This updated and less obscured image can then be presented in the user interface 119 for the user to view and provide an input specifying a user-specified identification of the map feature depicted in the image. If the user input is incorrect or the user cannot otherwise provide an identification, the process can be iterated by making an additional designated percentage or portion of the image visible, until a positive identification is made (e.g., the user-specified identification matches the known or ground truth identification of the map feature).

FIG. 4 is a diagram illustrating an example of obscuring images for determining a confidence level for map feature identification, according to one embodiment. As shown, an image 401 is selected for presentation to a user to assess the user's feature observation/perception capability. The image 401 depicts a landmark (e.g., the Eiffel Tower). An initial image 403a is created that completely obscures the Eiffel Tower. Each subsequent image 403b and 403b makes additional portions of the Eiffel Tower visible. After each image 403a-403c is individually presented to the user in a user interface 119, the user interface 119 asks the user to provide a user identification 405. In this example, the user is able provide the correct user identification 405 (e.g., the Eiffel Tower) after presentation of progressive image 403c.

In step 305, the image module 201 determines a percentage of the image that is visible at a time the input (e.g., input specifying a correct user identification of the depicted map feature) is received from the user. For instance, referring back to the example of FIG. 4, the percentage of visible image can be calculated as the ratio of the visible portion of the image 403c to the original image 401. This calculation process described above is provided by way of illustration and not as a limitation. It is contemplated that any process can be used and that the process can also depend on the method of obscuring the image. Examples of the different methods of obscuring an image and corresponding calculations are discussed below with respect to FIGS. 5A and 5B.

Figure 5A:
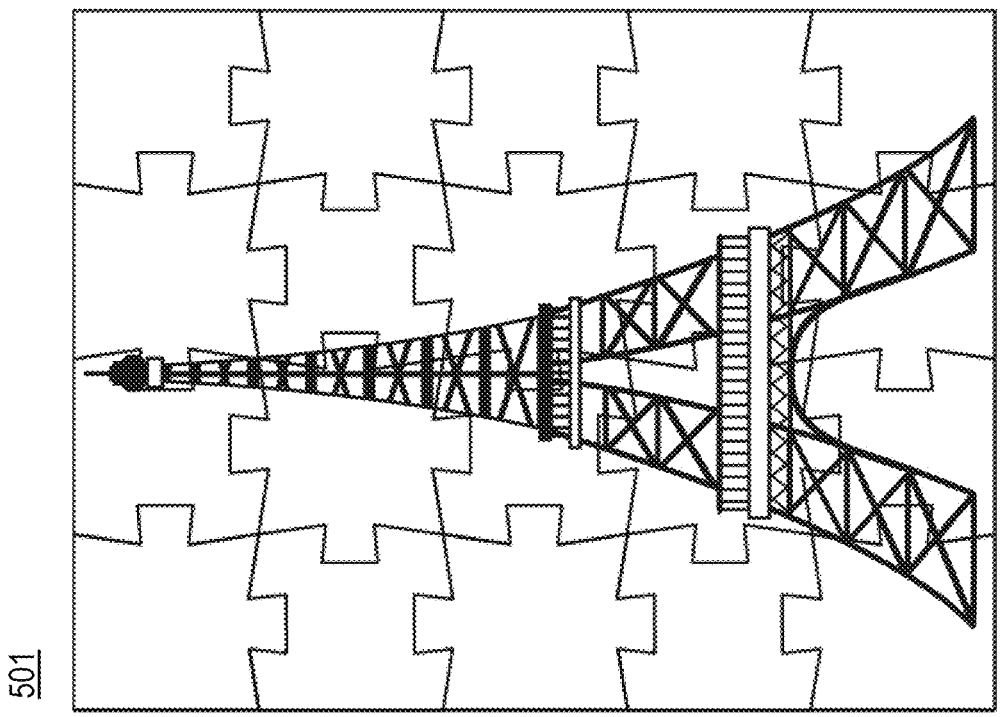
FIG. 5A is a diagram illustrating an example of a "jigsaw" approach to presenting images for determining a confidence level for map feature identification, according to one embodiment.

FIG. 5A is a diagram illustrating an example of a "jigsaw" approach to presenting images for determining a confidence level for map feature identification, according to one embodiment. With respect to embodiment of a jigsaw puzzle approach, a jigsaw puzzle is a tiling puzzle that is based on the assembly of often oddly shaped interlocking and mosaicked pieces. Typically, each individual piece has a portion of a picture; when assembled, they produce a complete picture. As shown in FIG. 5A, an image of the Eiffel Tower is converted to a jigsaw puzzle 501.

In this example, the user must correctly identify the depicted map feature (e.g., the Eiffel Tower) or any other locations, buildings, landmarks, restaurants, other POIs, etc. to move on to the next image or to complete the user observation/perception capability assessment. There is no need to assemble the entire jigsaw pieces. If the user can identify the correct identification of the depicted map feature by just but assembling couple of pieces that will also work.

This activity will help the mapping platform 101 to generate the map feature identification confidence level based on what percentage of the data/image needs to be visible for the user to identify the map feature.

For example, the jigsaw puzzle 501 of the Eiffel Tower has 20 jigsaw pieces and a user's is able to identify the correct landmark by joining five pieces. In this case, the confidence level of that user would be 75%. In other words, the user can correctly identify a map feature (e.g., a location, building, landmark, restaurant, other POI, etc.) by only seeing 25% of the data or image. In other words, the percentage of the image that is visible is based on a number of the one or more assembled pieces with respect to a total number of the plurality of pieces.

For some people who cannot answer the question correctly even, the confidence level would be at 0% which means the user can only identify the map feature if they see the map feature fully.

Figure 5B:
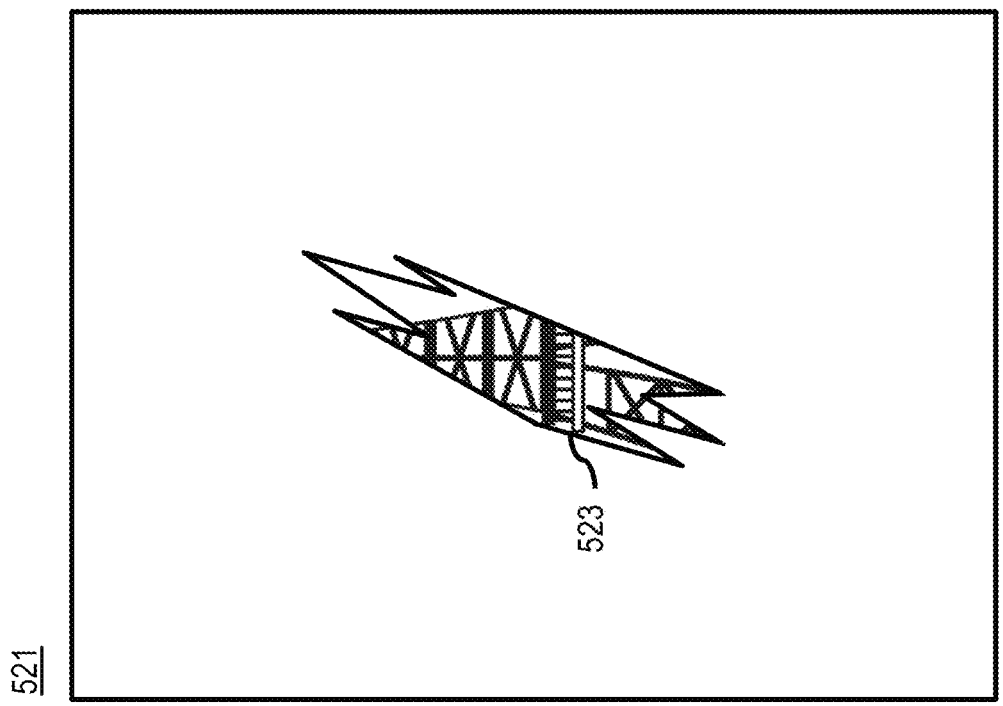
FIG. 5B is a diagram illustrating an example of a "scratch off" approach to presenting images for determining a confidence level for map feature identification, according to one embodiment.

FIG. 5B is a diagram illustrating an example of a "scratch off" approach to presenting images for determining a confidence level for map feature identification, according to one embodiment. With respect to a scratch off approach, a scratchcard (also called a scratch off, scratch ticket, scratcher, scratchum, scratch-it, scratch game, etc.) is a process where the hidden data is revealed when you scratch to remove (something) from an object or surface by rubbing with a sharp edge or tool. For this process, the map feature (e.g., location, buildings, landmark, restaurant, other POIs etc.) data will be hidden below the scratch layer (e.g., a virtual opaque layer). Via the user interface 119, the user will have to virtually scratch using mouse pointer to remove the layer so that the image of the map feature (e.g., location, building, landmark, restaurant, other POI, etc.) below the opaque layer can be revealed. As shown in FIG. 5B, an image of the Eiffel Tower is created as a virtual scratch off. The user can use a mouse to create the scratched off area 523 that reveals a portion of the image depicting the Eiffel Tower underneath.

As with the example of FIG. 5A, this activity will help the mapping platform 101 to generate the map feature identification confidence level for a user based on what percentage of the data/image needs to be visible for the user to identify the map feature. There is no need to scratch the entire opaque layer. If the user can identify the correct answer by scratching couple of areas (e.g., the scratched off area 523) that will also work.

For example, if the image hidden is the Eiffel Tower as shown, and a user is able to identify the correct landmark by removing/scratching 10% of the scratch layer, the confidence level of that user would be 90%. In other words, the user was able to correctly identify the Eiffel Tower by only seeing 10% of the data. For some people who cannot answer the question correctly, their map feature identification confidence level can be set to 0% which means they can only identify a map feature if they see the map feature fully.

Thus, in one embodiment, the image is obscured from view by overlaying an opaque layer over the image. The un-obscuring of the image comprises gradually removing the opaque layer to reveal the content of the image. Then, the percentage of the image that is visible is based on the percentage of the removed opaque layer.

In step 307, the confidence module 203 calculates a feature identification confidence level for the user based on the determined percentage as described in the examples of FIGS. 5A and 5B above. For example, the map identification confidence interval is inversely proportion to the percentage of the image that is visible when user correctly identifies the depicted map feature. In one embodiment, the user can be tested with multiple images and the map feature identification results can be aggregated to determine the map feature identification confidence level for a user.

In one embodiment, the imagery 117 can be stratified according to different contexts. Then the map feature identification confidence level can be determined with respect to each context. By way of example, the different contexts can include but is not limited to: (1) type of imagery (e.g., aerial versus street-level imagery); (2) temporal contexts (e.g., time of day, season, etc.); (3) environmental conditions (e.g., sunny, rainy, etc.); (4) lighting conditions (e.g., bright, dark, etc.); and/or the like.

For example, the confidence module 203 can generate the map feature identification confidence value based on the type of imagery set. The process here is to bifurcate the users answer (e.g., map feature identifications for images) based on the type of imagery used. The imagery set and corresponding answers can be aerial images versus street-level images. For example, if the user who is able to answer correctly by seeing 20% on an average only in street level imagery for all the images, and by seeing 60% on an average in satellite/aerial imagery, the confidence level of that user will be as follows:

Street Level imagery: ~80% (since the user is able to identify any location/Buildings/by just seeing 20% of the data); and Satellite/Aerial Imagery: ~40% (since the user is able to identify any location/Buildings/by just seeing 60% of the data)

Figure 6A:
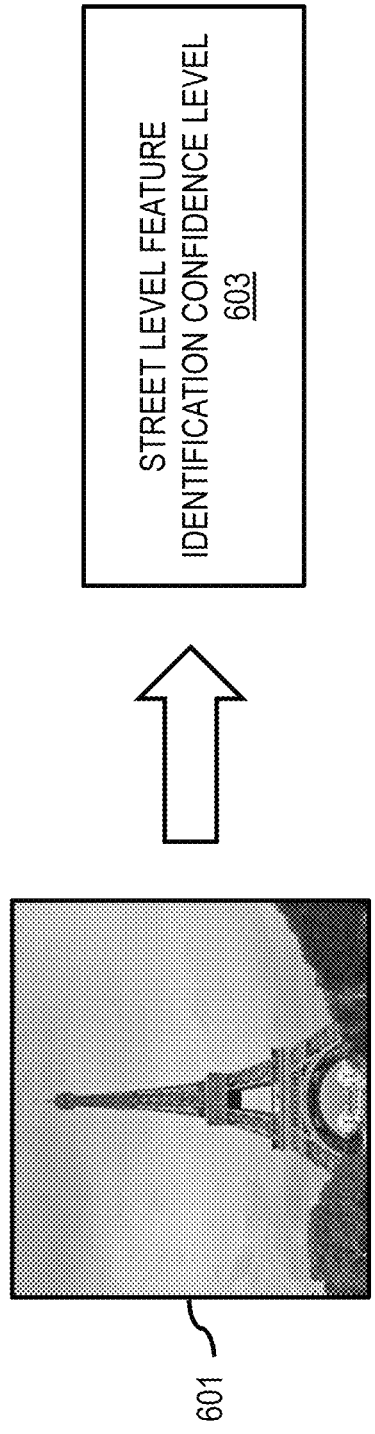
FIGS. 6A and 6B are diagrams illustrating example image types for determining a confidence level for map feature identification, according to one embodiment.
Figure 6B:
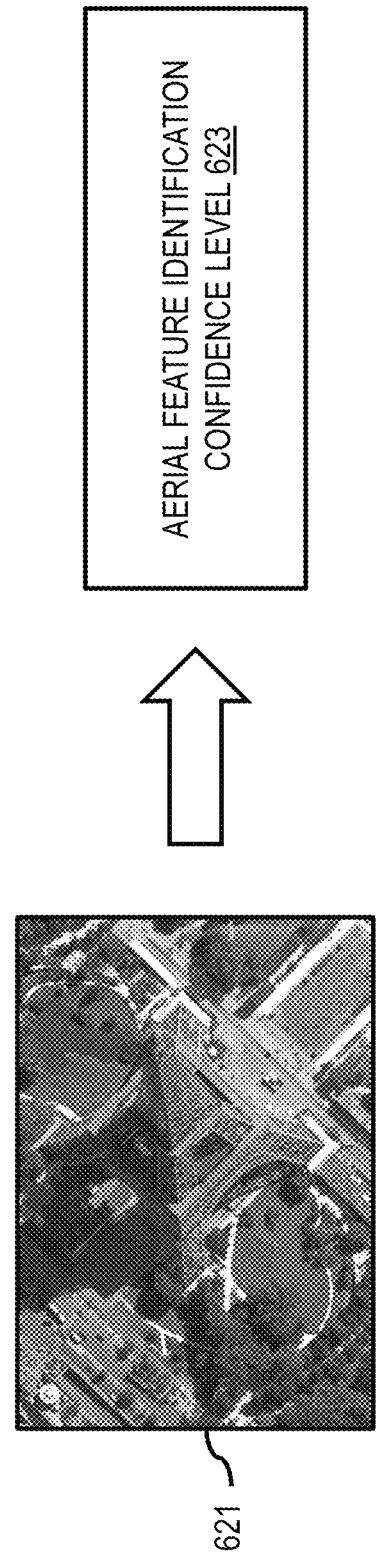

FIGS. 6A and 6B are diagrams illustrating example image types for determining a confidence level for map feature identification, according to one embodiment. In the example of FIG. 6A, the user is presented an imagery set 601 comprising street level imagery and assessed for map feature observation/perception according to the various embodiments described herein. The user map feature identification results for the imagery set 601 are then used to determine a map feature identification confidence with respect to street level imagery. In other words, the resulting confidence level is a street level feature identification confidence level 603 that is a metric of the user's observation/perception of street level images of map features.

In contrast, in the example of FIG. 6B, the user is presented an imagery set 621 comprising aerial imagery and assessed for map feature observation/perception according to the various embodiments described herein. The user map feature identification results for the imagery set 621 are then used to determine a map feature identification confidence with respect to street level imagery. In other words, the resulting confidence level is aerial feature identification confidence level 623 that is a metric of the user's observation/perception of aerial images of map features.

There may be differences in perception capabilities between street level and aerial imagery because users may be more familiar with street level images versus aerial images (or vice versa). These different types of imagery are also used in different applications. For example, street level imagery may be more common for first person perspective navigation, while aerial imagery may be more common for mapping use cases.

In step 309, the personalization module 205 personalizes an application to the user based on the feature identification confidence level. For example, the personalization module 205 can synchronize an individual's determined observation/perception capabilities with maps or other location-based applications. Synchronizing, for instance, refers to configuring maps or other location-based applications to operate based on the user's determined map feature identification confidence level (e.g., the user's observation/perception capability).

In one embodiment, the personalization module 205 provides the feature identification confidence level as an input feature to a machine learning model trained to determine one or more personalization options or parameters for the application. For example, if the application is a navigation application, then the personalizing of the application comprises determining a navigation guidance content, a navigation guidance timing, or a combination thereof.

In another example, based on the map feature identification results for different imagery, the map feature identification confidence level for a user can be entered in their map or navigation application profile, and voice and/or non-voice navigation will be provided accordingly. For example, in voice navigation scenarios, the traditional approach in maps is to provide navigation once the location or other map feature of interest is fully within the driver's line of sight. However, once the individual's observation/perception capability (e.g., map feature identification confidence level) is synced with maps, voice navigation can be done based on the confidence level.

FIGS. 7A and 7B are diagrams illustrating examples of personalizing navigation instructions based on a map feature identification confidence level, according to one embodiment. For example, in the scenario 701 of FIG. 7A, a user has been determined to have high map feature identification confidence level (80-90%) according to the various embodiments described herein. The mapping platform 101 and/or application 111 (e.g., the maps system) will provide navigation guidance by using the map features (e.g., locations, landmarks, POIs, etc.) which are farther away and/or partially obscured but still can be viewed by the user. In this example, the Eiffel Tower 703 is chosen as the landmark for navigation guidance and is partially obscured by a tree 705 in the line of sight of the user. Nevertheless, because the user has a high map identification confidence level (e.g., greater than 80%), the navigation application 111 can still present navigation guidance 707 that references the Eiffel Tower 703 (e.g., guidance that says "Take the first right turn after the Eiffel Tower") even when the Eiffel Tower 703 is relatively far from the driver and partially obscured by the tree 705.

In the scenario 721 of FIG. 7B, a user has been determined to have a low confidence level (10-20%) according to the various embodiments described herein. The mapping platform 101 and/or application 111 (e.g., the maps system) will provide navigation guidance by using the map features which are very close to the user and is completely visible by the user (e.g., not obscured in any way). In this example, the Eiffel Tower 723 is chosen as the landmark for navigation guidance. Accordingly, the mapping platform 101 and/or application 111 waits for the user to be close to the Eiffel Tower 723 or until the Eiffel Tower 723 is not obscured with another object to present the navigation guidance 725 that references the Eiffel Tower 703 (e.g., guidance that says "Take the first right turn after the Eiffel Tower") even when the Eiffel Tower 723 may have been partially visible earlier.

In another use case, the personalization module 205 can determine the map data to load onto the user's device, application, or a combination based on the user's feature identification confidence level. For example, if user has a higher map feature identification confidence level (e.g., greater than 80%), the mapping platform 101 can load or provide map features further in distance or otherwise obscured to the user's device or application. Conversely, if the user's map feature identification confidence level is below a threshold level, the mapping platform 101 can load map data for only close features (e.g., features within a threshold distance) or that are not obscured by any other objects.

Returning to FIG. 1, as shown, the system 100 includes the mapping platform 101 for determining a map feature identification confidence level for a user. In one embodiment, the mapping platform 101 has connectivity over the communication network 129 to services platform 105 that provides one or more services 107 that can use the map feature identification confidence data 123 and/or application personalization data 125 for downstream functions. By way of example, the services 107 may be third party services and include but is not limited to mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services 107 uses the output of the mapping platform 101 (e.g., map feature identification confidence data 123 and/or application personalization data 125) to provide services such as navigation, mapping, other location-based services, etc. to the vehicles 115, UEs 113, applications 111, and/or other client devices.

In one embodiment, the mapping platform 101 may be a platform with multiple interconnected components. The mapping platform 101 may include multiple servers, intelligent networking devices, computing devices, components, and corresponding software for determining map feature identification confidence levels for a given user according to the various embodiments described herein. In addition, it is noted that the mapping platform 101 may be a separate entity of the system 100, a part of one or more services 107, a part of the services platform 105, or included within components of the vehicles 115 and/or UEs 113.

In one embodiment, content providers 109 may provide content or data (e.g., including imagery 117, related geographic data, etc.) to the geographic database 103, machine learning system 127, the mapping platform 101, the services platform 105, the services 107, the vehicles 115, the UEs 113, and/or the applications 111 executing on the UEs 113. The content provided may be any type of content, such as imagery, probe data, machine learning models, permutations matrices, map embeddings, map content, textual content, audio content, video content, image content, etc. In one embodiment, the content providers 109 may provide content that may aid in determining map feature identification confidence levels for a given user according to the various embodiments described herein. In one embodiment, the content providers 109 may also store content associated with the geographic database 103, mapping platform 101, services platform 105, services 107, and/or any other component of the system 100. In another embodiment, the content providers 109 may manage access to a central repository of data, and offer a consistent, standard interface to data, such as a repository of the geographic database 103.

In one embodiment, the vehicles 115 and/or UEs 113 may execute software applications 111 to use map feature identification confidence data 123 and/or application personalization data 125 according to the embodiments described herein. By way of example, the applications 111 may also be any type of application that is executable on the vehicles 115 and/or UEs 113, such as autonomous driving applications, routing applications, mapping applications, location-based service applications, navigation applications, device control applications, content provisioning services, camera/imaging application, media player applications, social networking applications, calendar applications, and the like. In one embodiment, the applications 111 may act as a client for the mapping platform 101 and perform one or more functions associated with determining map feature identification confidence levels alone or in combination with the mapping platform 101.

By way of example, the vehicles 115 and/or UEs 113 are or can include any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the vehicles 115 and/or UEs 113 can support any type of interface to the user (such as "wearable" circuitry, etc.). In one embodiment, the vehicles 115 and/or UEs 113 may be associated with or be a component of a vehicle or any other device.

In one embodiment, the vehicles 115 and/or UEs 113 are configured with various sensors for generating or collecting imagery 117, related geographic data, etc. In one embodiment, the sensed data represent sensor data associated with a geographic location or coordinates at which the sensor data was collected, and the polyline or polygonal representations of detected objects of interest derived therefrom to generate the digital map data of the geographic database 103. By way of example, the sensors may include a global positioning sensor for gathering location data (e.g., GPS), IMUs, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the vehicles 115 and/or UEs 113 may include light sensors, orientation sensors augmented with height sensors and acceleration sensor, tilt sensors to detect the degree of incline or decline (e.g., slope) along a path of travel, moisture sensors, pressure sensors, etc. In a further example embodiment, sensors about the perimeter of the vehicles 115 and/or UEs 113 may detect the relative distance of the device or vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the vehicles 115 and/or UEs 113 may include GPS or other satellite-based receivers to obtain geographic coordinates from positioning satellites for determining current location and time. Further, the location can be determined by visual odometry, triangulation systems such as A-GP S, Cell of Origin, or other location extrapolation technologies.

In one embodiment, the communication network 129 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 101, services platform 105, services 107, vehicles 115 and/or UEs 113, and/or content providers 109 communicate with each other and other components of the system 100 using well known, new or still developing protocols. In this context, a protocol includes a set of rules defining how the network nodes within the communication network 129 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
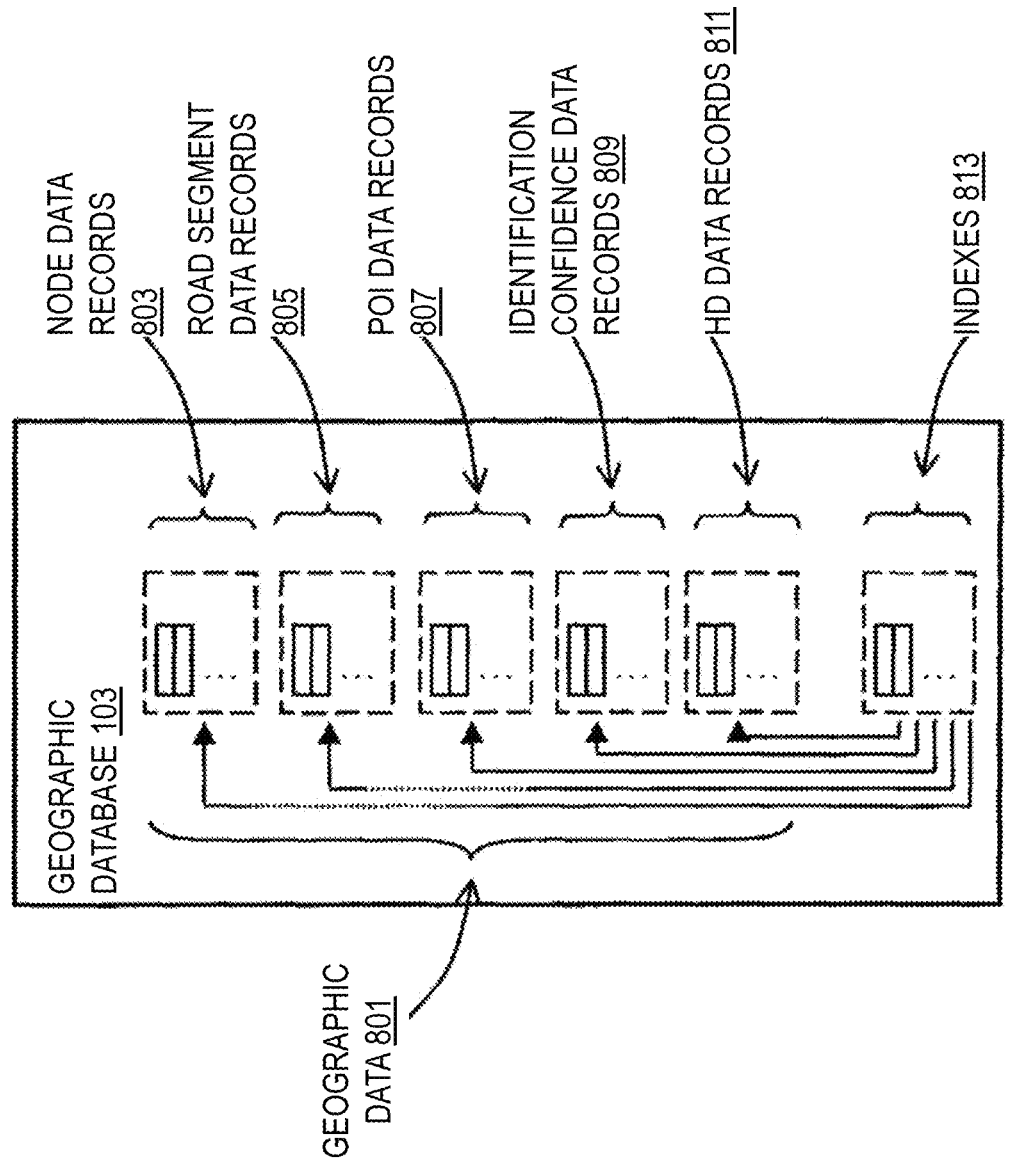
FIG. 8 is a diagram of a geographic database, according to one embodiment.

FIG. 8 is a diagram of a geographic database 103, according to one embodiment. In one embodiment, the geographic database 103 includes geographic data 801 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the geographic data 801. In one embodiment, the geographic database 103 include high definition (HD) mapping data that provide centimeter-level or better accuracy of map features. For example, the geographic database 103 can be based on Light Detection and Ranging (LiDAR) or equivalent technology to collect billions of 3D points and model road surfaces and other map features down to the number lanes and their widths. In one embodiment, the HD mapping data (e.g., HD data records 811) and/or other mapping data of the geographic database 103 capture and store details such as but not limited to road attributes and/or other features related to generating speed profile data. These details include but are not limited to road width, number of lanes, turn maneuver representations/guides, traffic lights, light timing/stats information, slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 103.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 103 follows certain conventions. For example, links do not cross themselves and do not cross each other except at a node. Also, there are no duplicated shape points, nodes, or links. Two links that connect each other have a common node. In the geographic database 103, overlapping geographic features are represented by overlapping polygons. When polygons overlap, the boundary of one polygon crosses the boundary of the other polygon. In the geographic database 103, the location at which the boundary of one polygon intersects they boundary of another polygon is represented by a node.

In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 103 includes node data records 803, road segment or link data records 805, POI data records 807, identification confidence data records 809, HD mapping data records 811, and indexes 813, for example. More, fewer, or different data records can be provided. In one embodiment, additional data records (not shown) can include cartographic ("carto") data records, routing data, and maneuver data. In one embodiment, the indexes 813 may improve the speed of data retrieval operations in the geographic database 103. In one embodiment, the indexes 813 may be used to quickly locate data without having to search every row in the geographic database 103 every time it is accessed. For example, in one embodiment, the indexes 813 can be a spatial index of the polygon points associated with stored feature polygons. In one or more embodiments, data of a data record may be attributes of another data record.

In exemplary embodiments, the road segment data records 805 are links or segments representing roads, streets, or paths, as can be used in the calculated route or recorded route information for determination of speed profile data. The node data records 803 are end points (for example, representing intersections or an end of a road) corresponding to the respective links or segments of the road segment data records 805. The road link data records 805 and the node data records 803 represent a road network, such as used by vehicles, cars, and/or other entities. Alternatively, the geographic database 103 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 103 can include data about the POIs and their respective locations in the POI data records 807. The geographic database 103 can also include data about road attributes (e.g., traffic lights, stop signs, yield signs, roundabouts, lane count, road width, lane width, etc.), places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, the geographic database 103 can also include identification confidence data records 809 for storing image identification data 121, identification confidence data 123, application personalization data 125, any other related data that is used or generated according to the embodiments described herein. By way of example, the identification confidence data records 809 can be associated with one or more of the node records 803, road segment records 805, and/or POI data records 807 to associate the speed profile data records 809 with specific places, POIs, geographic areas, and/or other map features. In this way, the linearized data records 809 can also be associated with the characteristics or metadata of the corresponding records 803, 805, and/or 807.

In one embodiment, as discussed above, the HD mapping data records 811 model road surfaces and other map features to centimeter-level or better accuracy. The HD mapping data records 811 also include ground truth object models that provide the precise object geometry with polylines or polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 811 are divided into spatial partitions of varying sizes to provide HD mapping data to end user devices with near real-time speed without overloading the available resources of the devices (e.g., computational, memory, bandwidth, etc. resources).

In one embodiment, the HD mapping data records 811 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 811.

In one embodiment, the HD mapping data records 811 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time data (e.g., including probe trajectories) also at centimeter-level accuracy. Other sensor data can include vehicle telemetry or operational data such as windshield wiper activation state, braking state, steering angle, accelerator position, and/or the like.

In one embodiment, the geographic database 103 can be maintained by the content provider 109 in association with the mapping platform 101 (e.g., a map developer or service provider). The map developer can collect geographic data to generate and enhance the geographic database 103. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 103 can be a master geographic database stored in a format that facilitates updating, maintenance, and development. For example, the master geographic database or data in the master geographic database can be in an Oracle spatial format or other format (e.g., capable of accommodating multiple/different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by vehicles 115 and/or UEs 113. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for determining a confidence level for map feature identification may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
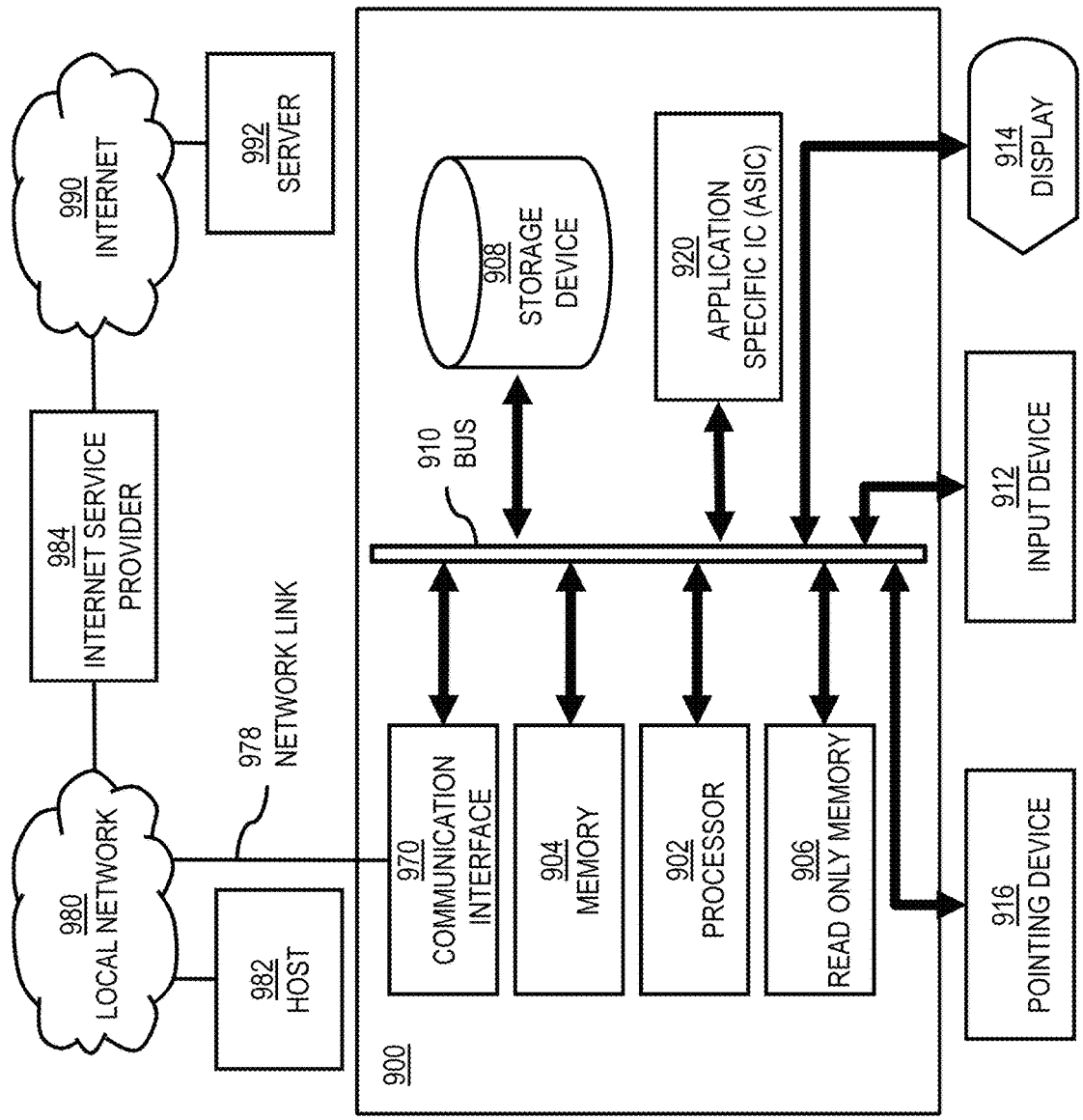
FIG. 9 is a diagram of hardware that can be used to implement an embodiment of the processes described herein.

FIG. 9 illustrates a computer system 900 upon which an embodiment of the invention may be implemented. Computer system 900 is programmed (e.g., via computer program code or instructions) to determine a confidence level for map feature identification as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to determining a confidence level for map feature identification. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for determining a confidence level for map feature identification. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for determining a confidence level for map feature identification, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 129 for determining a confidence level for map feature identification.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system can be deployed in various configurations within other computer systems, e.g., host 982 and server 992.

FIG. 10 illustrates a chip set 1000 upon which an embodiment of the invention may be implemented. Chip set 1000 is programmed to determine a confidence level for map feature identification as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to determine a confidence level for map feature identification. The memory 1005 also stores the data associated with or generated by the execution of the inventive steps.

Figure 11:
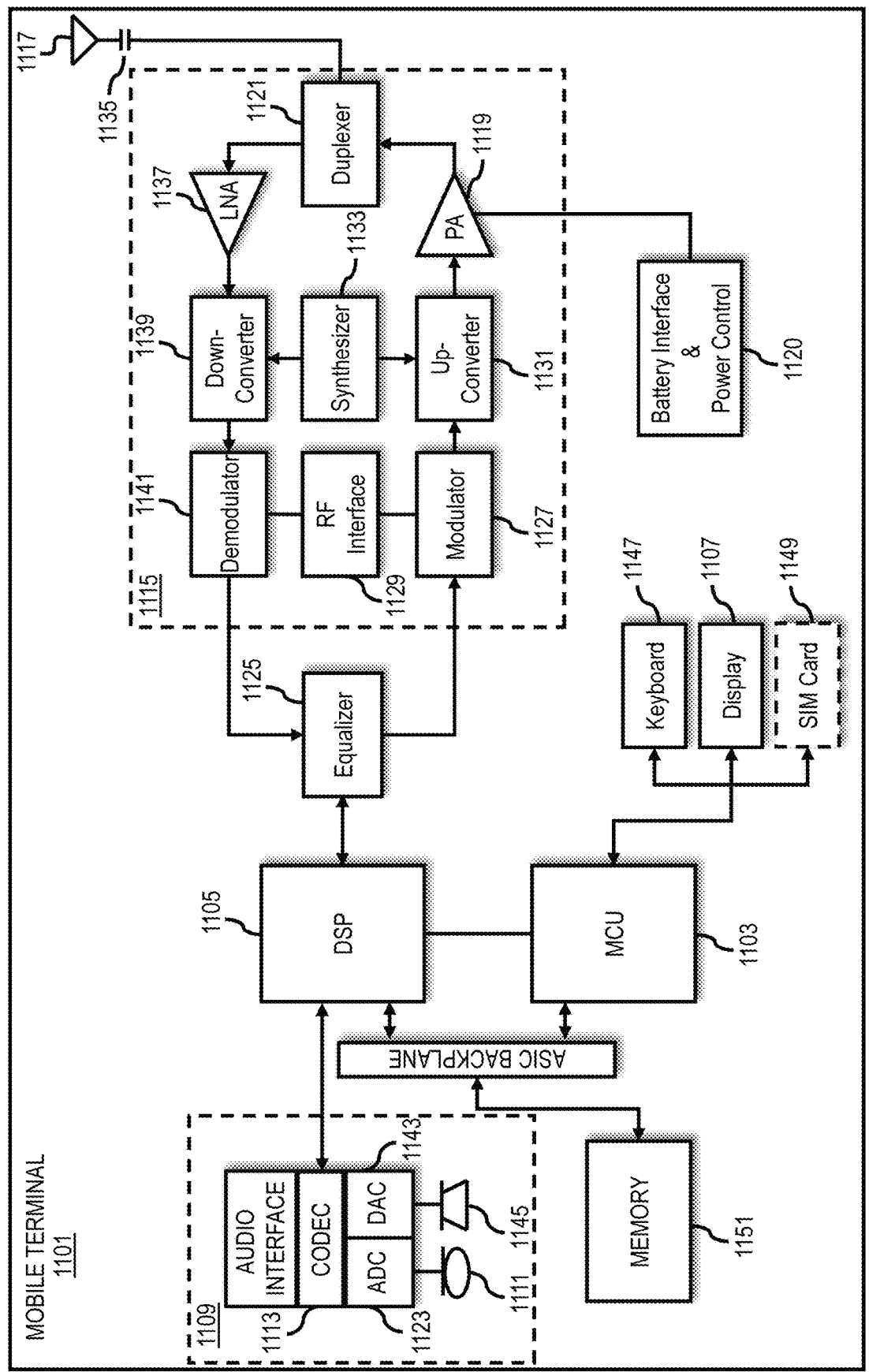
FIG. 11 is a diagram of a terminal that can be used to implement an embodiment of the processes described herein.

FIG. 11 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to determine a confidence level for map feature identification. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   presenting an image of a map feature in a user interface of a device, wherein the image is initially presented with a content of the image obscured from view;
   progressively un-obscuring the image in the user interface until an input identifying the map feature is received from a user via the user interface;
   determining a percentage of the image that is visible at a time the input is received from the user;
   calculating a feature identification confidence level for the user based on the determined percentage; and
   personalizing an application to the user based on the feature identification confidence level.

2. The method of claim 1, wherein the application is a navigation application, and wherein the personalizing of the application comprises determining a navigation guidance content, a navigation guidance timing, or a combination thereof.

3. The method of claim 1, wherein the image is an aerial image, and wherein the feature identification confidence level is determined with respect to aerial imagery.

4. The method of claim 1, wherein the image is a street level image, and wherein the feature identification confidence level is determined with respect to street-level imagery.

5. The method of claim 1, further comprising:
   providing the feature identification confidence level as an input feature to a machine learning model trained to determine one or more personalization options for the application.

6. The method of claim 1, further comprising:
   determining map data to load onto the device, the application, or a combination based on the feature identification confidence level.

7. The method of claim 1, wherein the image is obscured from view by tiling the image into a plurality of pieces, and wherein the un-obscuring of the image comprises virtually assembling one or more pieces of the plurality of pieces.

8. The method of claim 7, wherein the percentage of the image that is visible is based on a number of the one or more assembled pieces with respect to a total number of the plurality of pieces.

9. The method of claim 1, wherein the image is obscured from view by overlaying an opaque layer over the image, and wherein the un-obscuring of the image comprises gradually removing the opaque layer to reveal the content of the image.

10. The method of claim 9, wherein the percentage of the image that is visible is based on the percentage of the removed opaque layer.

11. An apparatus comprising:
   at least one processor; and
   at least one memory including computer program code for one or more programs,
   the at least one memory and the computer program code configured to, with the at least one processor, cause the apparatus to perform at least the following,
      present an image of a map feature in a user interface of a device, wherein the image is initially presented with a content of the image obscured from view;
      progressively un-obscure the image in the user interface until an input identifying the map feature is received from a user via the user interface;
      determine a percentage of the image that is visible at a time the input is received from the user;
      calculate a feature identification confidence level for the user based on the determined percentage; and
      personalize an application to the user based on the feature identification confidence level.

12. The apparatus of claim 11, wherein the application is a navigation application, and wherein the personalizing of the application comprises determining a navigation guidance content, a navigation guidance timing, or a combination thereof.

13. The apparatus of claim 11, wherein the image is an aerial image, and wherein the feature identification confidence level is determined with respect to aerial imagery.

14. The apparatus of claim 11, wherein the image is a street level image, and wherein the feature identification confidence level is determined with respect to street-level imagery.

15. The apparatus of claim 11, wherein the apparatus is further caused to:
provide the feature identification confidence level as an input feature to a machine learning model trained to determine one or more personalization options for the application.

16. A non-transitory computer-readable storage medium carrying one or more sequences of one or more instructions which, when executed by one or more processors, cause an apparatus to perform:
presenting an image of a map feature in a user interface of a device, wherein the image is initially presented with a content of the image obscured from view;
progressively un-obscuring the image in the user interface until an input identifying the map feature is received from a user via the user interface;
determining a percentage of the image that is visible at a time the input is received from the user;
calculating a feature identification confidence level for the user based on the determined percentage; and
personalizing an application to the user based on the feature identification confidence level.

17. The non-transitory computer-readable storage medium of claim 16, wherein the application is a navigation application, and wherein the personalizing of the application comprises determining a navigation guidance content, a navigation guidance timing, or a combination thereof.

18. The non-transitory computer-readable storage medium of claim 16, wherein the image is an aerial image, and wherein the feature identification confidence level is determined with respect to aerial imagery.

19. The non-transitory computer-readable storage medium of claim 16, wherein the image is a street level image, and wherein the feature identification confidence level is determined with respect to street-level imagery.

20. The non-transitory computer-readable storage medium of claim 16, wherein the apparatus is configured to further perform:
providing the feature identification confidence level as an input feature to a machine learning model trained to determine one or more personalization options for the application.

* * * * *